(12) United States Patent
Nakashima et al.

(10) Patent No.: US 11,663,453 B2
(45) Date of Patent: May 30, 2023

(54) INFORMATION PROCESSING APPARATUS AND MEMORY CONTROL METHOD

(71) Applicant: CANON KABUSHIKI KAISHA, Tokyo (JP)

(72) Inventors: Daisuke Nakashima, Kawasaki (JP); Tse-Wei Chen, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 485 days.

(21) Appl. No.: 16/733,443

(22) Filed: Jan. 3, 2020

(65) Prior Publication Data

US 2020/0225877 A1 Jul. 16, 2020

(30) Foreign Application Priority Data

Jan. 10, 2019 (JP) .............................. JP2019-002778

(51) Int. Cl.
| | |
|---|---|
| *G06F 3/06* | (2006.01) |
| *G06K 9/62* | (2022.01) |
| *G06N 3/04* | (2006.01) |
| *G06F 5/16* | (2006.01) |
| *G06T 1/60* | (2006.01) |
| *H04N 5/232* | (2006.01) |

(Continued)

(52) U.S. Cl.
CPC ............ *G06N 3/063* (2013.01); *G06F 3/0604* (2013.01); *G06F 3/0659* (2013.01); *G06F 3/0673* (2013.01); *G06F 18/214* (2023.01); *G06N 3/04* (2013.01)

(58) Field of Classification Search
CPC ................................ G06F 11/209; G06N 3/08
See application file for complete search history.

(56) References Cited

U.S. PATENT DOCUMENTS

| 11,005,274 B2* | 5/2021 | Hwang | ................ G01R 31/382 |
| 2018/0121795 A1* | 5/2018 | Kato | ................... G06F 15/7867 |

(Continued)

FOREIGN PATENT DOCUMENTS

| CN | 101681449 A | 3/2010 |
| JP | 2006171244 A | 6/2006 |
| JP | 2018147182 A | 9/2018 |

OTHER PUBLICATIONS

Extended European Search Report issued in European Appln. No. 20150157.4 dated May 29, 2020.

(Continued)

*Primary Examiner* — Getente A Yimer

(74) *Attorney, Agent, or Firm* — Rossi, Kimms & McDowell LLP

(57) ABSTRACT

There is provided with an information processing apparatus. A control unit controls writing of weight data to a first memory and a second memory, and controls readout of the weight data from the first memory and the second memory. The control unit further switches an operation between a first operation in which a processing unit reads out first weight data from the first memory and performs the convolution operation processing using the first weight data while the processing unit writes second weight data to the second memory in parallel, and a second operation in which the processing unit reads out the first weight data from both the first memory and the second memory and performs the convolution operation processing using the first weight data.

21 Claims, 11 Drawing Sheets

(51) Int. Cl.
  *G06N 3/063* (2023.01)
  *G06T 1/20* (2006.01)
  *G06F 18/214* (2023.01)

(56) References Cited

U.S. PATENT DOCUMENTS

2018/0189643 A1* 7/2018 Kim .................. G06F 17/153
2018/0253641 A1   9/2018 Yachide
2018/0356987 A1* 12/2018 Tsujii ................ G06F 11/2097
2020/0234099 A1* 7/2020 Wang ................. G06N 3/08

OTHER PUBLICATIONS

Boni. "A real-time beamformer for high frame rate ultrasound imaging." IEEE International Ultrasonics Symposium Proceedings 2016: 1-4.
Bai. "A CNN Accelerator on FPGA Using Depthwise Separable Convolution." arXiv:1809.01536v2 [eess.SP] Sep. 6, 2018: 1-5.

* cited by examiner

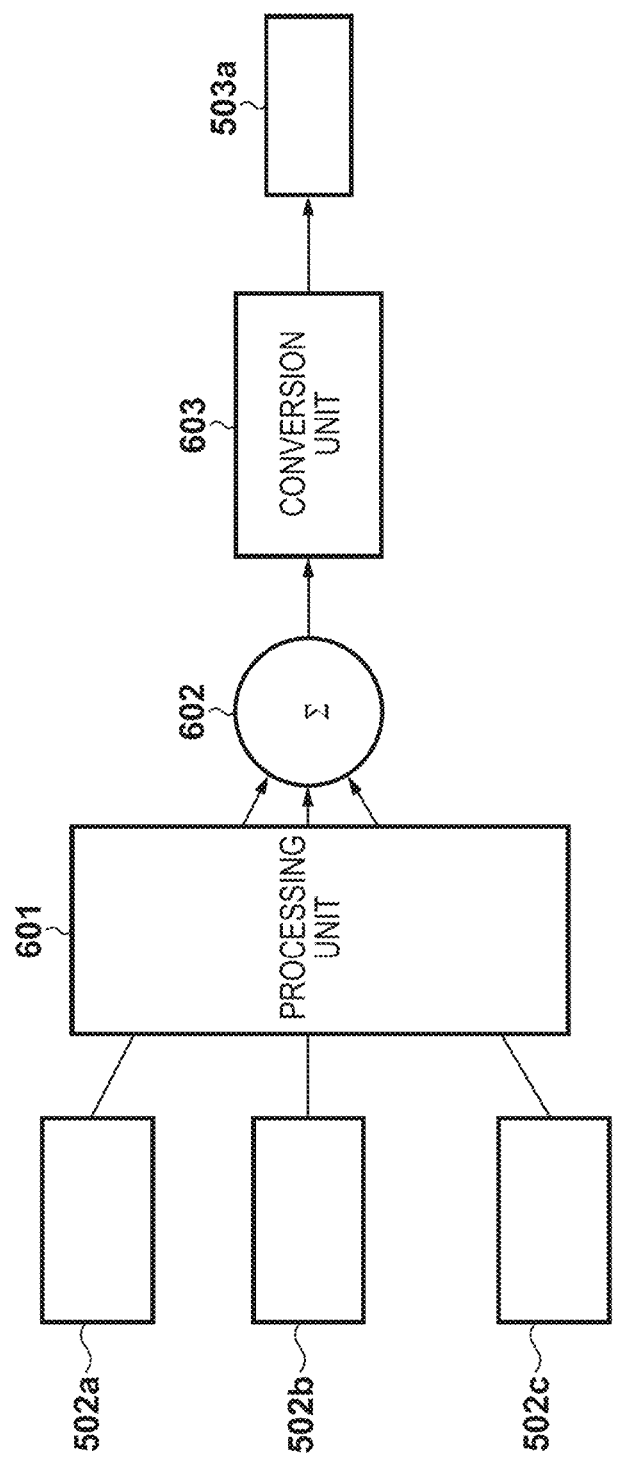

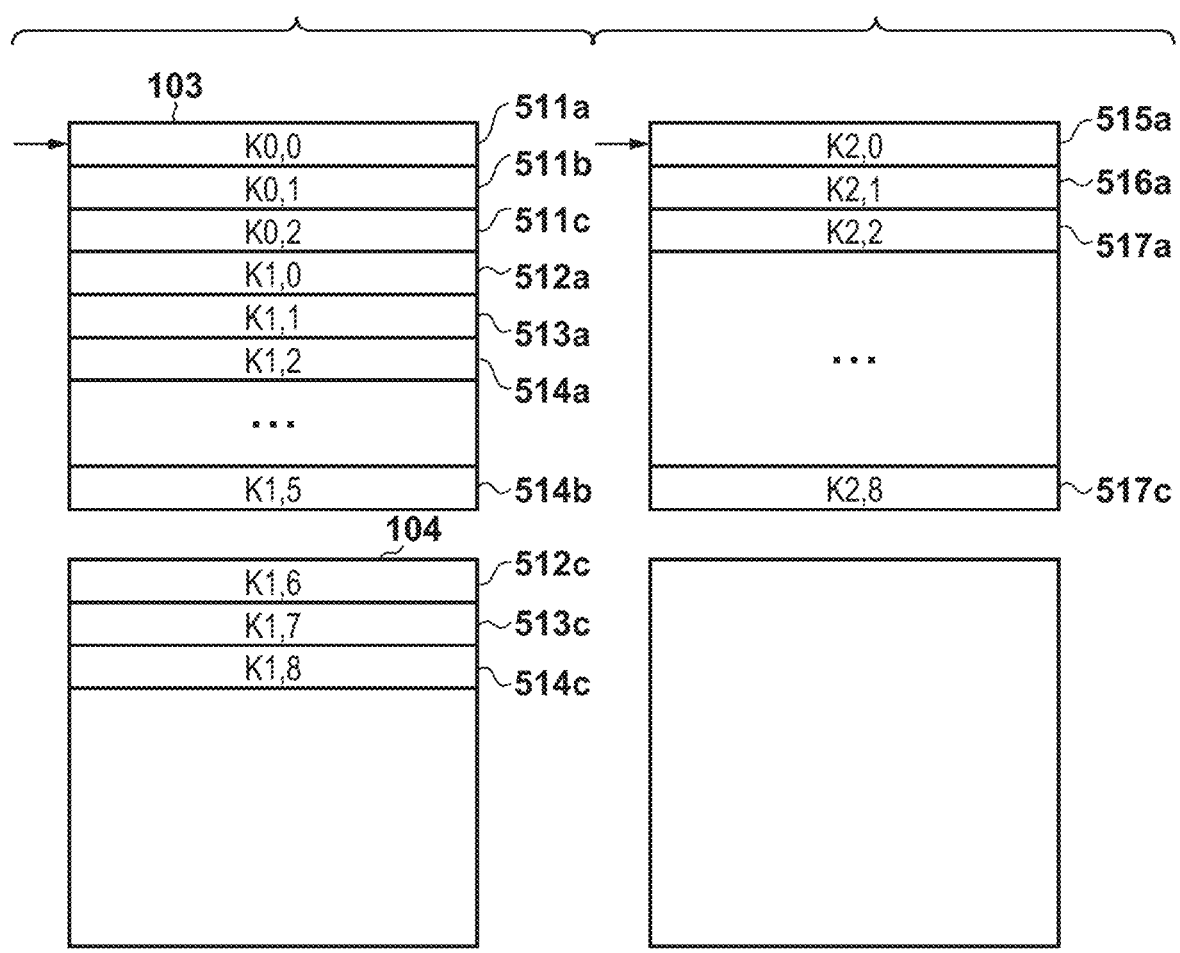

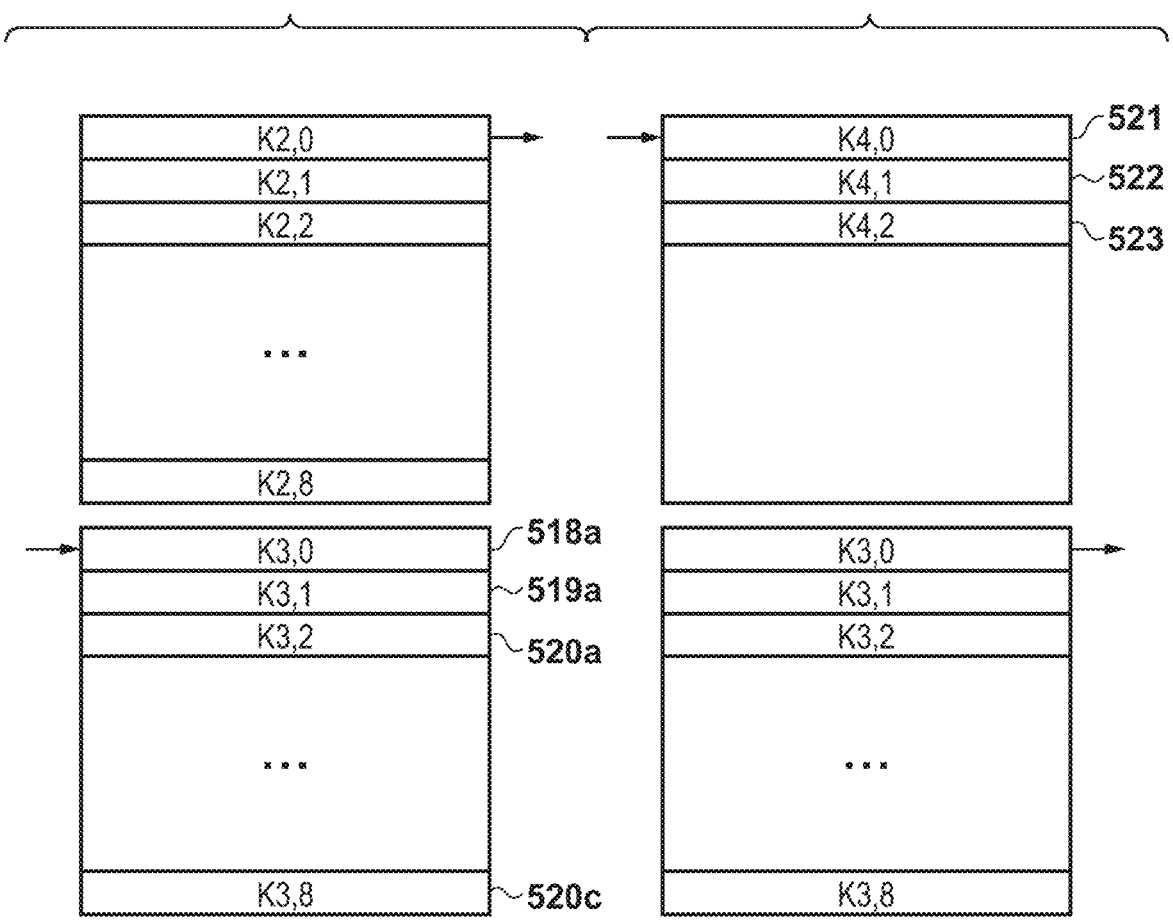

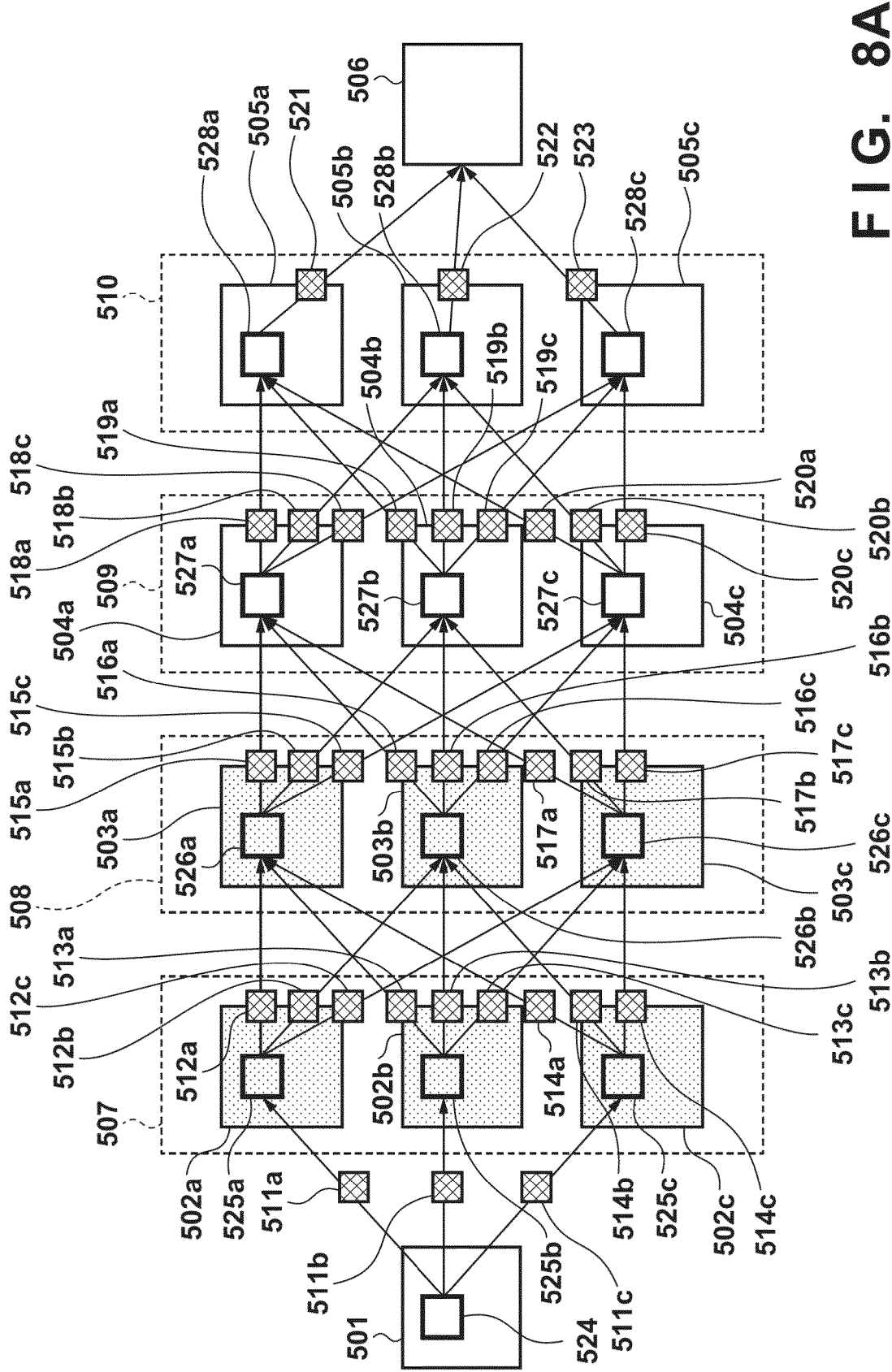

| PROCESS SUBSET | PROCESSING METHOD | LAYER NUMBER | FEATURE PLANE COUNT | FEATURE PLANE SIZE | KERNEL SIZE |
|---|---|---|---|---|---|
| 1 | RING BUFFER | 0 (INPUT LAYER) | 1 | 400×400 | 3×3 |
| | | 1 | 3 | 200×200 | 3×3 |
| 2 | FRAME BUFFER | 2 | 3 | 100×100 | 3×3 |
| 3 | FRAME BUFFER | 3 | 3 | 50×50 | 3×3 |
| 4 | FRAME BUFFER | 4 | 3 | 25×25 | 3×3 |

FIG. 9

| PROCESS SUBSET | PROCESSING METHOD | LAYER NUMBER | FEATURE PLANE COUNT | FEATURE PLANE SIZE | KERNEL SIZE |
|---|---|---|---|---|---|
| 1 | RING BUFFER | 0 (INPUT LAYER) | 1 | 400×400 | 3×3 |
| | | 1 | 16 | 200×200 | 3×3 |
| | | 2 | 32 | 100×100 | 3×3 |
| | | 3 | 64 | 50×50 | 3×3 |
| 2 | FRAME BUFFER | 4 | 64 | 25×25 | 3×3 |
| 3 | FRAME BUFFER | 5 | 64 | 25×25 | 3×3 |
| 4 | FRAME BUFFER | 6 | 64 | 25×25 | 3×3 |
| 5 | FRAME BUFFER | 7 | 64 | 25×25 | 3×3 |

| PROCESS SUBSET | PROCESSING METHOD | LAYER NUMBER | FEATURE PLANE COUNT | FEATURE PLANE SIZE | KERNEL SIZE |
|---|---|---|---|---|---|
| 1 | FRAME BUFFER | 0 (INPUT LAYER) | 1 | 400×400 | 3×3 |
| 2 | FRAME BUFFER | 1 | 3 | 200×200 | 3×3 |
| 3 | FRAME BUFFER | 2 | 3 | 100×100 | 3×3 |
| 4 | FRAME BUFFER | 3 | 3 | 50×50 | 3×3 |
| 5 | FRAME BUFFER | 4 | 5 | 25×25 | 3×3 |

FIG. 12

| PROCESS SUBSET | PROCESSING METHOD | WEIGHT ALREADY STORED | NEXT WEIGHT STORAGE ALLOWED | WEIGHT STORAGE DESTINATION | NUMBER OF KERNEL | LAYER NUMBER | FEATURE PLANE COUNT | FEATURE PLANE SIZE | KERNEL SIZE |
|---|---|---|---|---|---|---|---|---|---|
| 1 | RING BUFFER | NO | NO | 1,2 | 12 | 0 (INPUT LAYER) | 1 | 400×400 | 3×3 |
| | | | | | | 1 | 3 | 200×200 | 3×3 |
| 2 | FRAME BUFFER | YES | YES | 1 | 9 | 2 | 3 | 100×100 | 3×3 |
| 3 | FRAME BUFFER | YES | YES | 2 | 9 | 3 | 3 | 50×50 | 3×3 |
| 4 | FRAME BUFFER | YES | NO | 1 | 9 | 4 | 3 | 25×25 | 3×3 |

INFORMATION PROCESSING APPARATUS AND MEMORY CONTROL METHOD

BACKGROUND OF THE INVENTION

Field of the Invention

The present invention relates to an information processing apparatus and a memory control method, and particularly to memory control in processing such as pattern recognition processing or the like using a neural network.

Description of the Related Art

In various fields that include pattern recognition such as image recognition, voice recognition, or the like, a layered calculation method represented by a neural network is widely used. Accordingly, there is proposed a method of implementing a neural network in a high-performance yet low cost manner.

FIG. 5 shows an example of convolutional neural networks (to be referred to as a CNN hereinafter) as an example of a neural network. FIG. 5 shows an input layer 501, feature planes 502a to 502c of a first layer 507, feature planes 503a to 503c of a second layer 508, feature planes 504a to 504c of a third layer 509, feature planes 505a to 505c of a fourth layer 510, and a feature plane 506 of a fifth layer. The input layer 501 corresponds to input data to the CNN and, for example, corresponds to image data of a predetermined size when a CNN operation is to be performed on the image data. Each feature plane is a data plane corresponding to a processing result obtained from predetermined feature extraction operations (convolution operation and nonlinear processing). Since each feature plane is a processing result of the image data, it can be expressed as a plane. Reference symbols 524, 525a to 525c, 526a to 526c, 527a to 527c, and 528a to 528c denote areas referred to in one convolution operation. In addition, reference symbols 511a to 511c, 512a to 514c, 515a to 517c, 518a to 520c, and 521 to 523 denote two-dimensional weights (kernels) used in the convolution operation. The CNN may further include many more feature planes and layers.

A two-dimensional convolution operation in which the kernel size is columnSize×rowSize can be implemented by performing a product-sum operation as shown by $$\text{output}(x, y) = \sum_{row=-rowSize/2}^{rowSize/2} \sum_{column=-columnSize/2}^{columnSize/2} \text{input}(x + column, y + row) \times \text{weight}(column, row) \quad (1)$$

wherein input(x, y) is a reference pixel value of two-dimensional coordinates (x, y) and output(x, y) is an operation result of the two-dimensional coordinates (x, y) in equation (1). weight(column, row) is a weight coefficient of a position(column, row) in an area referred in one convolution operation. columnSize and rowSize are the kernel size in the vertical direction and the kernel size in the horizontal direction, respectively.

In this manner, in the CNN operation, a write operation on the memory of each feature plane of a preceding layer, a write operation on the memory of each kernel, a product-sum operation using data read out from each memory, and outputting of each feature plane of the succeeding layer obtained from the product-sum operation are repetitively performed.

In recent years, due to the development of deep learning techniques, the scale of a neural network is increasing. To reduce the size of the buffer memory for reading each kernel, each kernel in the buffer memory can be switched in accordance with the progression of the CNN operation. In particular, in a case in which a hardware accelerator is used for the purpose of speeding up the CNN operation, each required kernel may be obtained from a memory outside the accelerator and be switched with each kernel held in the buffer memory inside the accelerator. This kind of an arrangement can reduce the circuit scale of the accelerator.

Japanese Patent Laid-Open No. 2018-147182 proposes an arrangement in which the kernel buffer processing method is switched in accordance with the network arrangement of the CNN for the purpose of reducing the size of the buffer memory for reading each feature plane and kernel. Japanese Patent Laid-Open No. 2018-147182 proposes, for example, switching between a ring buffer method in which the buffer memory holds kernels of a plurality of layers and a frame buffer method in which the buffer memory hold kernels of one layer. More specifically, the two processing methods described above are switched for each layer so that the sum of the memory for storing each feature plane and memory for storing each weight will be minimized.

SUMMARY OF THE INVENTION

According to an embodiment of the present invention, an information processing apparatus comprises: a first memory and a second memory; a control unit configured to control writing of weight data to be used for convolution operation processing in a neural network to the first memory and the second memory, and to control readout of the weight data to be used for the convolution operation processing from the first memory and the second memory; and a processing unit configured to perform the convolution operation processing by using the weight data read out from at least one of the first memory and the second memory, wherein the control unit is further configured to switch an operation between a first operation in which the processing unit reads out first weight data from the first memory and performs the convolution operation processing using the first weight data while the processing unit writes second weight data to the second memory in parallel, and a second operation in which the processing unit reads out the first weight data from both the first memory and the second memory and performs the convolution operation processing using the first weight data.

According to another embodiment of the present invention, a memory control method of an information processing apparatus which comprises a first memory and a second memory comprises: controlling writing of weight data to be used for convolution operation processing in a neural network to the first memory and the second memory, and readout of the weight data to be used for the convolution operation processing from the first memory and the second memory, such that an operation is switched between a first operation of reading out first weight data from the first memory and performing the convolution operation processing using the first weight data while writing second weight data to the second memory in parallel, and a second operation of reading out the first weight data from both the first memory and the second memory and performing the convolution operation processing using the first weight data.

Further features of the present invention will become apparent from the following description of exemplary embodiments (with reference to the attached drawings).

BRIEF DESCRIPTION OF THE DRAWINGS

FIG. 6 is a block diagram showing an example of the arrangement of operation hardware of the CNN;

FIGS. 7A to 7D are views showing the use states of a weight storage unit in the embodiment;

FIGS. 8A and 8B are views for explaining CNN processing methods;

FIG. 9 is a table showing network information used in the embodiment;

FIG. 10 is a table showing the network information used in the embodiment;

FIG. 11 is a table showing the network information used in the embodiment; and

FIG. 12 is a table showing the network information used in another embodiment.

DESCRIPTION OF THE EMBODIMENTS

Figure 1:
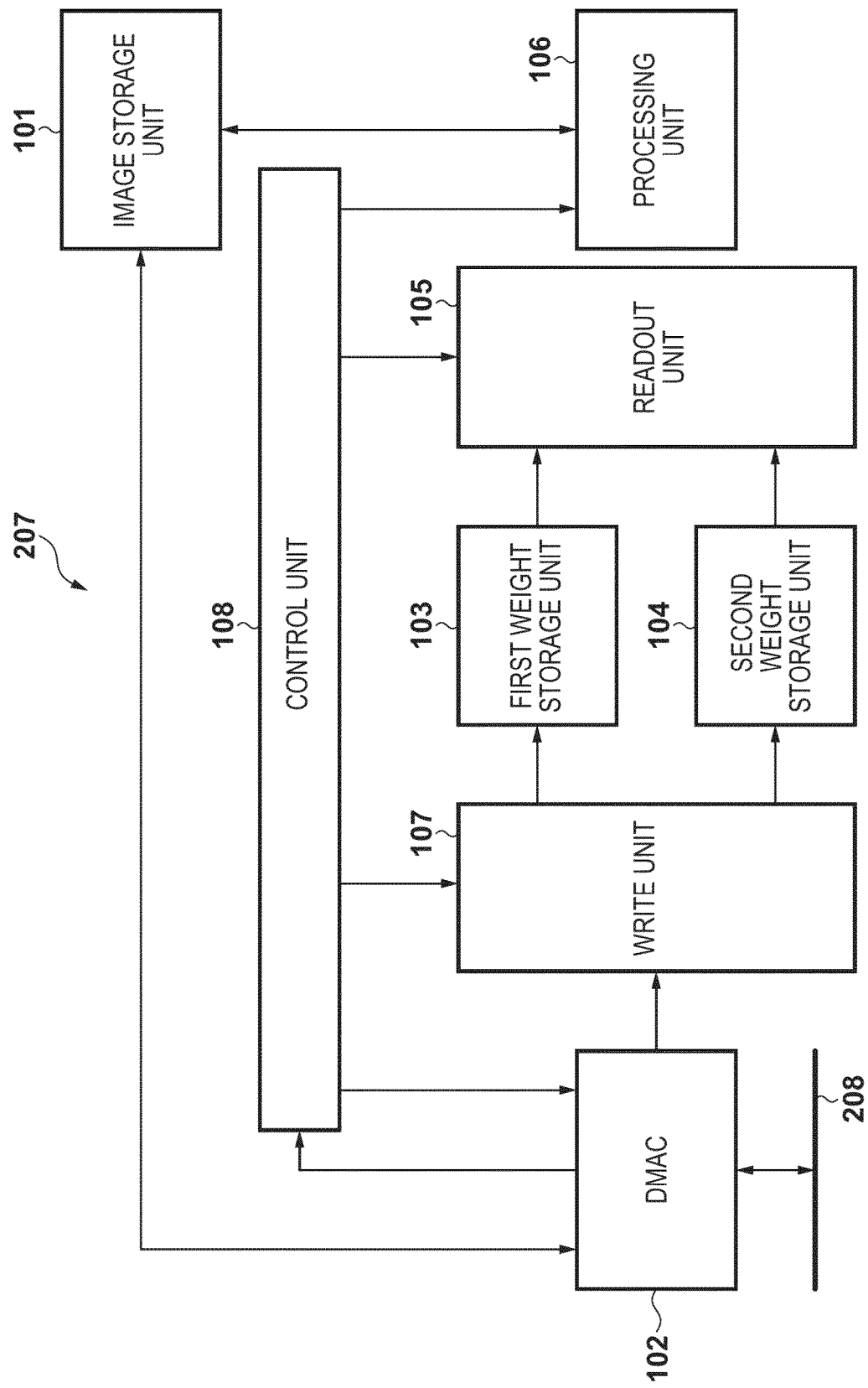
FIG. 1 is a block diagram showing an example of the arrangement for performing processing using neural networks.

In an arrangement that switches the kernels of the buffer memory, the CNN operation may be delayed due to the time required for transferring each kernel to the buffer memory. To mask such kernel transfer time, two areas which can be accessed simultaneously are provided in the buffer memory, and a kernel to be used in the operation is read out from one area, and another kernel to be used in the next operation can be written in the other area in parallel.

However, this kind of a method is problematic in that the circuit scale will increase because it requires twice the memory capacity compared to a case in which the buffer memory has only one area which cannot be accessed simultaneously. In particular, when employing a buffer method in which the buffer memory holds kernels of a plurality of layers as in Japanese Patent Laid-Open No. 2018-147182, the memory capacity necessary for holding kernels will increase. On the other hand, if the size of the buffer memory for holding the kernels is reduced to suppress the circuit size, the scale of the CNN that can be processed will be limited.

An embodiment of the present invention can increase the operation speed while suppressing the memory amount required for an information processing apparatus to perform an operation according to a neural network.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 2:
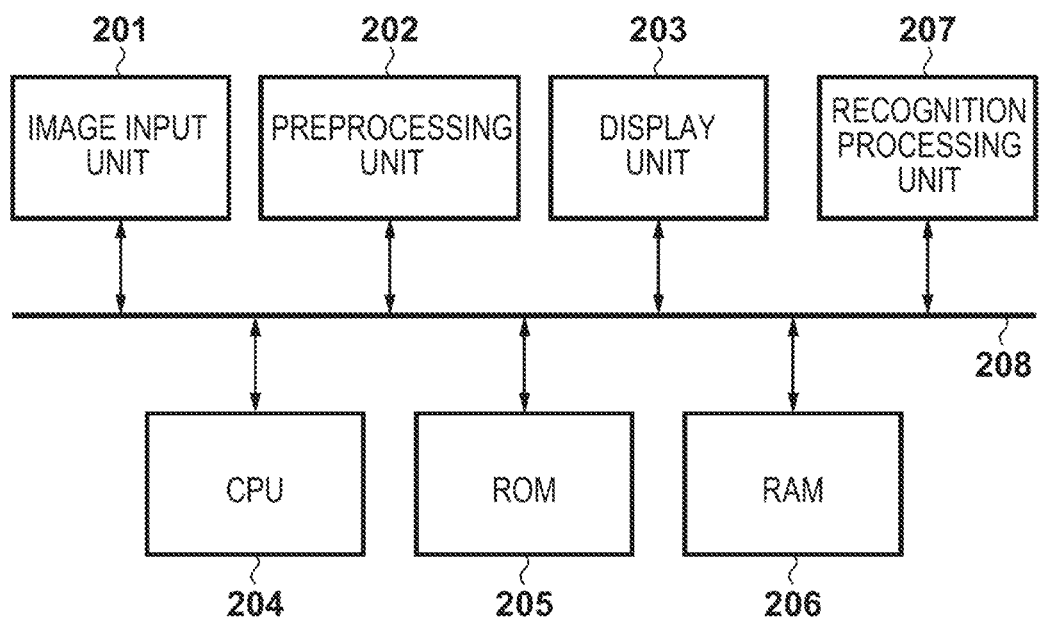
FIG. 2 is a block diagram showing an example of the arrangement of an information processing apparatus that performs recognition processing.

FIG. 1 shows an example of the system arrangement of an information processing apparatus that performs processing using a neural network according to the first embodiment. FIG. 2 shows an example of the system arrangement of an information processing apparatus that includes a recognition processing unit 207 as the information processing apparatus according to the first embodiment and performs pattern recognition. The type of pattern recognition used in this embodiment is not particularly limited. For example, pattern recognition includes processing to detect a predetermined pattern (for example, an object) in image data and processing to detect a predetermined pattern (for example, a word) in voice data. An example of performing pattern recognition on image data will be described hereinafter.

First, the arrangement of the information processing apparatus according to FIG. 2 will be described. An image input unit 201 obtains recognition target data. For example, the image input unit 201 can obtain a pattern recognition target image. The image input unit 201 can be, for example, an image capturing apparatus. For example, the image input unit 201 can include an optical system, a photoelectric conversion device, a driver circuit that controls the photoelectric conversion device, an AD converter, a signal processing circuit that performs various kinds of image correction processing, a frame buffer, and the like. As the photoelectric conversion device, a CCD (Charge-Coupled Device), a CMOS (Complementary Metal Oxide Semiconductor) sensor, and the like can be raised. In addition, the image input unit 201 can be an interface that obtains image data from an image capturing apparatus or a storage device.

A preprocessing unit 202 performs preprocessing to effectively perform pattern recognition processing. For example, image data conversion processing such as color conversion processing, contrast correction processing, and the like can be performed as preprocessing. In this embodiment, the preprocessing unit 202 includes hardware for performing image data conversion processing. On the other hand, a CPU 204 may perform such conversion processing in accordance with a program. The image data input from the image input unit 201 is processed in the preprocessing unit 202 and is subsequently stored in a RAM 206.

A display unit 203 is a display device such as a CRT, a liquid crystal display, or the like. The display unit 203 may be an external display connected, via a cable or the like, to the information processing apparatus shown in FIG. 2. The display unit 203 can display an image and a pattern recognition result. The display unit 203 can display an image showing a pattern recognition result and may display, for example, an image obtained by superimposing a frame indicating the detection result on an input image when object detection is to be performed.

The recognition processing unit 207 performs processing using a neural network. A more specific arrangement of the recognition processing unit 207 will be described in detail later. In this embodiment, the recognition processing unit 207 generates feature information that is obtained by inputting, to the neural network, recognition target data obtained by the image input unit 201 and processed by the preprocessing unit 202. In this manner, the recognition processing unit 207 can perform layered feature extraction processing on the recognition target data.

The CPU 204 controls the operation of the overall information processing system. Also, the CPU 204 can perform post-processing on the processing result obtained by the recognition processing unit 207. For example, the CPU 204 can generate and output information indicating a pattern recognized in the recognition target data by referring to the obtained feature information by operating in accordance with a program. As a more specific example, the recognition processing unit 207 may generate, at each position in the recognition target image data, information that indicates whether a specific pattern (for example, an object such as a human body, a face, or the like) is present or information that indicates the size of the specific pattern. In this case, the CPU 204 can generate, as the pattern recognition result, information which indicates the position or the size of a specific pattern (for example, an object) in the image data. The information processing apparatus according to this embodiment may also have, as a matter of course, dedicated hardware for generating information that indicate a pattern.

A ROM 205 and the RAM 206 provide the CPU 204 with programs, data, work area, and the like required to execute processing. In a case in which a program required for processing is stored in the ROM 205, the program is temporarily loaded to the RAM 206, and the program is executed by the CPU 204. The information processing apparatus according to this embodiment may include, instead of the ROM 205, a storage medium that stores these programs or data. The RAM 206 can store, other than data required for processing, image data that has undergone preprocessing by the preprocessing unit 202, the processing result from the recognition processing unit 207, CNN network information (to be described later), each kernel (weight data) to be used in the CNN operation, and the like. A bus 208 connects the components of the information processing apparatus to each other.

The arrangement of the recognition processing unit 207 will be described in detail hereinafter. In this embodiment, the recognition processing unit 207 performs processing using a CNN. A case in which the recognition processing unit 207 uses a CNN that has the arrangement shown in FIG. 5 will be described below. Each weight used in the CNN corresponds to a two-dimensional kernel. In the example hereinafter, the kernel size to be used is 3×3 and corresponds to one byte per one element. In addition, since each feature plane is associated with all of the feature planes of an adjacent layer, a given feature plane is calculated by using all of the feature planes of the preceding layer.

Figure 5:
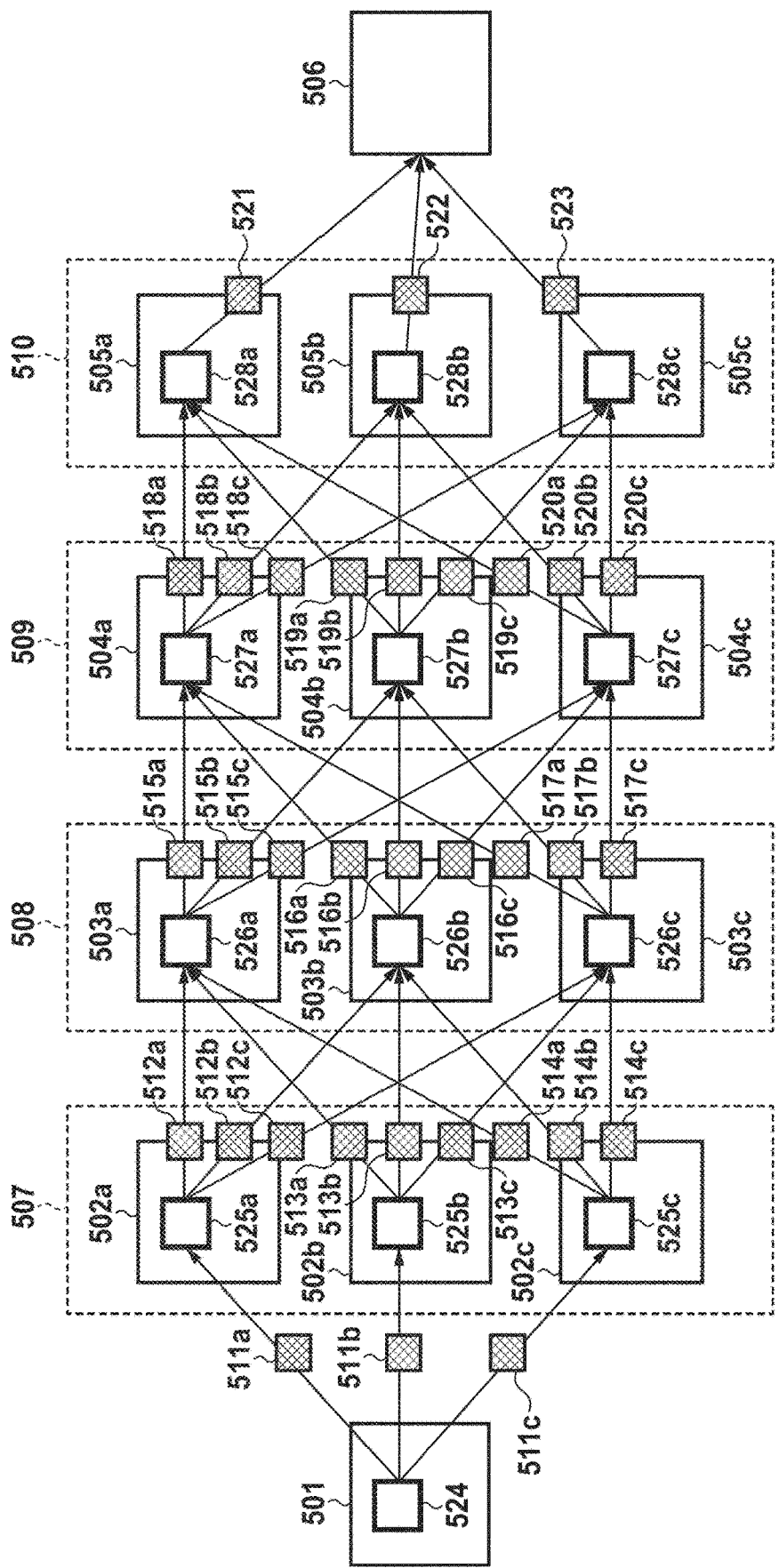
FIG. 5 is a view showing an example of the arrangement of a CNN.

In a CNN operation, a product-sum operation is repeatedly performed by scanning a plurality of kernels on a pixel basis. Each kernel can be predetermined by using a method such as back propagation learning or the like. Each feature plane may also be calculated by performing nonlinear conversion on a result of a product-sum operation. FIG. 6 is an example of the arrangement of hardware that can execute a CNN operation according to this embodiment, and a processing unit 106 (to be described later) may have the arrangement shown in FIG. 6. A feature plane 503a of FIG. 5 is calculated by using three feature planes 502a to 502c of a first layer 507 which is the preceding layer. In this case, a processing unit 601 first executes a convolution operation on each of the feature planes 502a to 502c. Next, an addition unit 602 cumulatively adds the results obtained from the convolution operations performed on the respective feature planes 502a to 502c. Finally, a conversion unit 603 performs nonlinear conversion processing using a ReLU (Rectified Linear Unit) function, a logistic function, or the like on the cumulative addition result. The feature plane 503a is calculated by scanning and performing the processing for each pixel of the entire feature plane. Note that in this specification, processing using a feature plane of a given layer will be called the processing performed on the layer, and a kernel to be used in this processing will be called the kernel of the layer.

FIG. 1 is a block diagram showing the arrangement of the recognition processing unit 207. A first weight storage unit 103 (first memory) and a second weight storage unit 104 (second memory) are buffer memories included in the recognition processing unit 207 to store kernels. In this embodiment, the first weight storage unit 103 and the second weight storage unit 104 can be accessed simultaneously. On the other hand, in this embodiment, data cannot be read from the first weight storage unit 103 while data being written thereto, and data cannot be written to the first weight storage unit 103 while data being read therefrom. The second weight storage unit 104 also operates in a similar manner. In this embodiment, the first weight storage unit 103 and the second weight storage unit 104 are different memory devices, and more specifically, memory areas of different memory devices.

In this embodiment, the data width of each of the first weight storage unit 103 and the second weight storage unit 104 is set in accordance with the kernel size and is 9 bytes. Also, the word length of each of the first weight storage unit 103 and the second weight storage unit 104 is set in accordance with the maximum number of kernels per one layer in processing on the second layer 508 to fourth layer 510 in accordance with the frame buffer method, and is 9 words. This kind of an arrangement allows the weight storage units to be used in the frame buffer method in accordance with a double buffer method. In this manner, each weight storage unit can store 9 kernels each having a 3×3 kernel size.

A DMAC 102, a readout unit 105, and write unit 107 are memory controllers that instruct the first weight storage unit 103 and the second weight storage unit 104 to perform a weight data write operation and a weight data readout operation under the control of a control unit 108.

The DMAC 102 reads out preprocessed image data and kernels from the RAM 206 and transmits the data and kernels to an image storage unit 101 and the write unit 107. In addition, the DMAC 102 reads out and transmits the network information of the CNN from the RAM 206 to the control unit 108. After the completion of the CNN operation, the DMAC 102 stores the CNN operation processing result stored in the image storage unit 101 in the RAM 206.

Network information is information used to control the CNN operation. For example, the order and the method of the CNN operation may be defined in the network information. FIG. 9 shows network information used in this embodiment as an example of network information. As shown in FIG. 9, network information can include the index of each process subset, the processing method of each process subset, a processing target layer number, the feature plane count of each layer, the size of each feature plane, and the kernel size. In this embodiment, the network information is prepared in advance and is stored in, for example, the ROM 205, the RAM 206, or the like.

A process subset refers to a unit at which each kernel is switched. That is, after one set of kernels is used to perform an operation for one process subset, another set of kernels is used to perform an operation for another process subset next. Processing using a neural network includes a plurality of process subsets. Each process subset is a part of the convolution operation processing in the neural network and is processed sequentially. A set of kernels used in an Nth process subset will be simply referred to as Nth kernels hereinafter. For example, the Nth kernels are weight data used in the convolution operation processing performed in the Nth process subset, and (N+1)th kernels are weight data used in the convolution operation processing performed in the (N+1)th process subset.

The processing method defines the operation order in each process subset. A frame buffer method and a ring buffer method are used as the processing methods in this embodiment. In a case in which the frame buffer method is used as the processing method, one process subset corresponds to processing performed on one layer. In a case in which the ring buffer method is used as the processing method, one process subset includes processing performed on a plurality of layers. In the example shown in FIG. 9, the ring buffer method is used to perform processing performed on an input layer 501 and the first layer 507. Also, the frame buffer method will be used to perform processing on a second layer 508 to a fourth layer 510.

FIG. 8A is a view for explaining a frame buffer method operation. In the frame buffer method, a CNN operation is performed sequentially on each layer. In this embodiment, one process subset according to the frame buffer method is a convolution operation processing performed on all of the areas belonging to one layer in a neural network. In this case, the kernels of the layer which is to undergo the operation will be stored in a buffer memory. For example, in a case in which processing is to be performed on the second layer 508, kernels 515a to 515c, kernels 516a to 516c, and kernels 517a to 517c will be stored in the buffer memory. Subsequently, a feature plane 504a is calculated by executing a CNN operation using the kernels 515a to 517a on the feature planes 503a to 503c. In a similar manner, a feature plane 504b and a feature plane 504c are calculated by executing CNN operations using the kernels 515b to 517b and the kernels 515c to 517c, respectively.

Figure 8B:
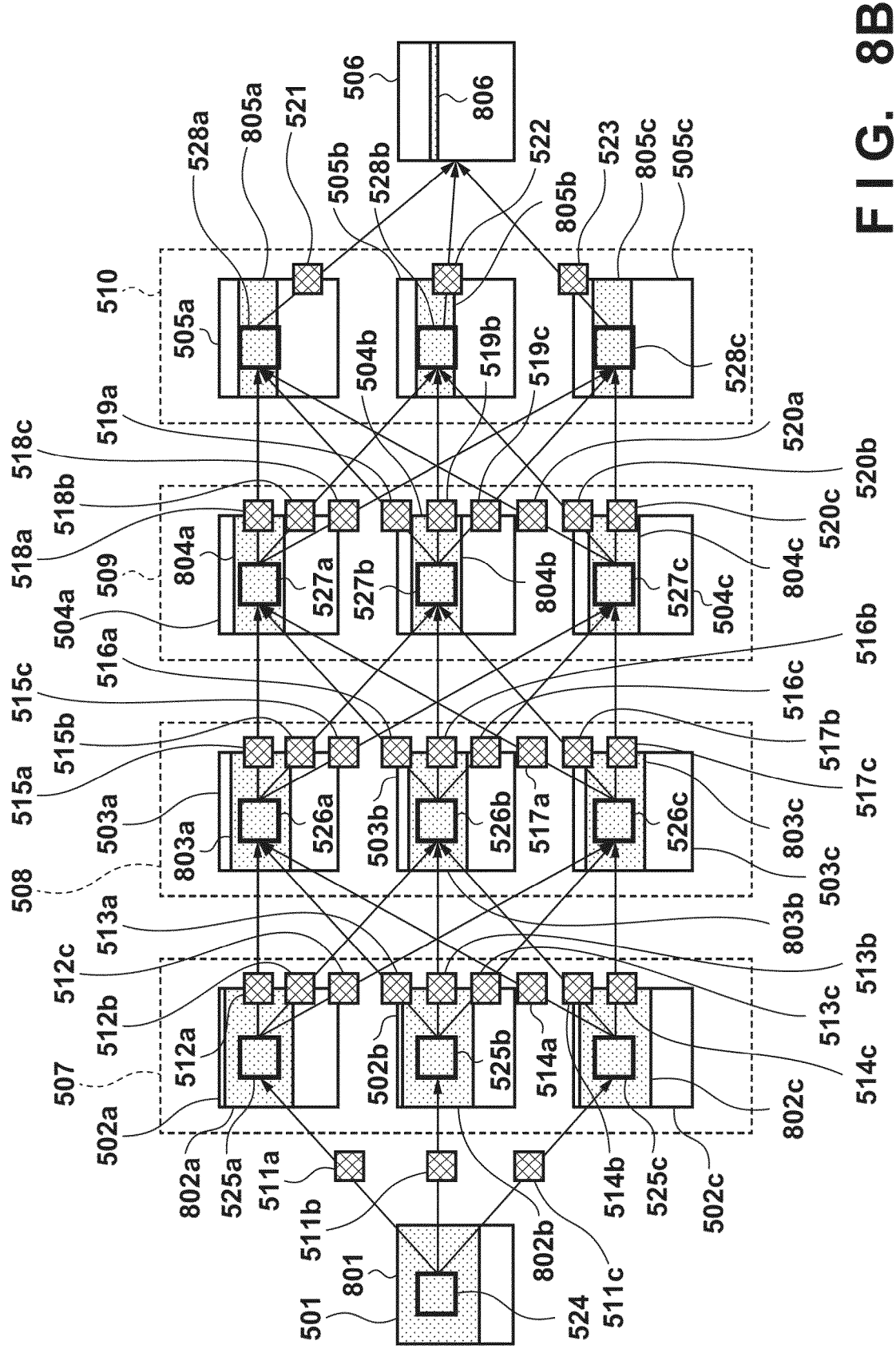

FIG. 8B is a view for explaining a ring buffer method operation. Partial processing of a plurality of layers is performed repeatedly in the ring buffer method. In this embodiment, in one process subset according to the ring buffer method, after convolution operation processing is performed on a first area in two or more layers of the neural network, the convolution operation processing is performed on a second area in two or more layers. For example, in order to obtain an area 806 in a feature plane 506, a CNN operation is performed on areas 528a to 528c which are parts of feature planes 505a to 505c of the fourth layer 510, respectively. Hence, kernels 521 to 523 are stored in a buffer memory. In addition, to calculate the areas 528a to 528c, a CNN operation is performed on each of areas 527a to 527c of the feature planes 504a to 504c of the third layer 509. Hence, kernels 518a to 520c are also stored in the buffer memory. In this manner, the kernels of each processing target layer are stored in the buffer memory and the CNN operation is performed across each layer. Subsequently, the CNN operation is performed across each layer for another area.

Note that the information processing apparatus according to this embodiment can include a buffer memory (not shown) for storing image data or feature planes required for a CNN operation. For example, in a case in which processing is to be performed on the second layer 508 by the frame buffer method as described above, this buffer memory can store the feature planes 503a to 503c required for the operation. In addition, in a case in which the area 806 is to be obtained by using the ring buffer method as described above, this buffer memory can store the areas 527a to 527c and the areas 528a to 528c and the like required for the operation.

The write unit 107 stores each kernel received from the DMAC 102 in the first weight storage unit 103 and the second weight storage unit 104 in accordance with a control signal from the control unit 108. The control signal input from the control unit 108 can include a signal indicating the number of kernels to be stored and a signal indicating the weight storage unit which is to be the storage destination. The write unit 107 stores the designated number of kernels in the designated weight storage unit sequentially from the first address. In a case in which the first weight storage unit 103 has been designated as the storage destination and the designated number of kernels is larger than the word length of the first weight storage unit 103, the write unit 107 stores the kernels in the entire address of the first weight storage unit 103. The write unit 107 then sequentially stores, in the second weight storage unit 104, the remaining kernels from the first address.

The readout unit 105 reads out the kernels stored in the first weight storage unit 103 and the second weight storage unit 104 and transmits the kernels to the processing unit 106 in accordance with the control signal from the control unit 108. The control signal input from the control unit 108 can include a signal indicating the weight storage unit to be the readout source and a signal indicating the address of each kernel to be read out. The readout unit 105 reads out each kernel from the designated address of the designated weight storage unit and transmits the kernels to the processing unit 106.

The processing unit 106 reads out image data as input data from the image storage unit 101 and uses the kernels received from the readout unit 105 to execute a CNN operation on a layer basis. Subsequently, the processing unit 106 stores the operation result in the image storage unit 101. The processing unit 106 can be implemented by using, for example, the hardware shown in FIG. 6.

The control unit 108 controls the DMAC 102, the write unit 107, the readout unit 105, and the processing unit 106 based on the network information received from the DMAC 102. The control unit 108 can hold information indicating the process subset of the kernels stored by the first weight storage unit 103 and the second weight storage unit 104. In this embodiment, the control unit 108 refers to and updates this information to perform memory control to control the kernel storage method. More specifically, in this embodiment, the control unit 108 controls the write operation of kernels, used in the convolution operation processing of the neural network, performed on the first weight storage unit 103 (first memory) and the second weight storage unit 104 (second memory). The control unit 108 also controls the operation to read out the kernels, used in the convolution operation processing, from the first weight storage unit 103 and the second weight storage unit 104 to the processing unit 106.

In this embodiment, the control unit 108 can control the write operation of the kernels and the readout operation of the kernels by switching between a first operation and a second operation as a control method. In the first operation, the write operation of first weight data to the first memory is performed, and subsequently, the readout operation of the first weight data from the first memory and the write operation of second weight data to the second memory are performed in parallel. In this specification, this kind of method used in the first operation will be referred to as the double buffer method. In this method, the readout operation and the write operation of the weight data are performed in parallel to each other.

On the other hand, in the second operation, the write operation of first weight data to the first memory and the second memory is performed, and subsequently the readout operation of the first weight data from the first memory and the second memory is performed. In this specification, this kind of method used in the second operation will be referred to as the single buffer method. In this method, the readout of the weight data and the write of the weight data can be performed exclusively.

<Operation of Information Processing Apparatus>

Figure 4:
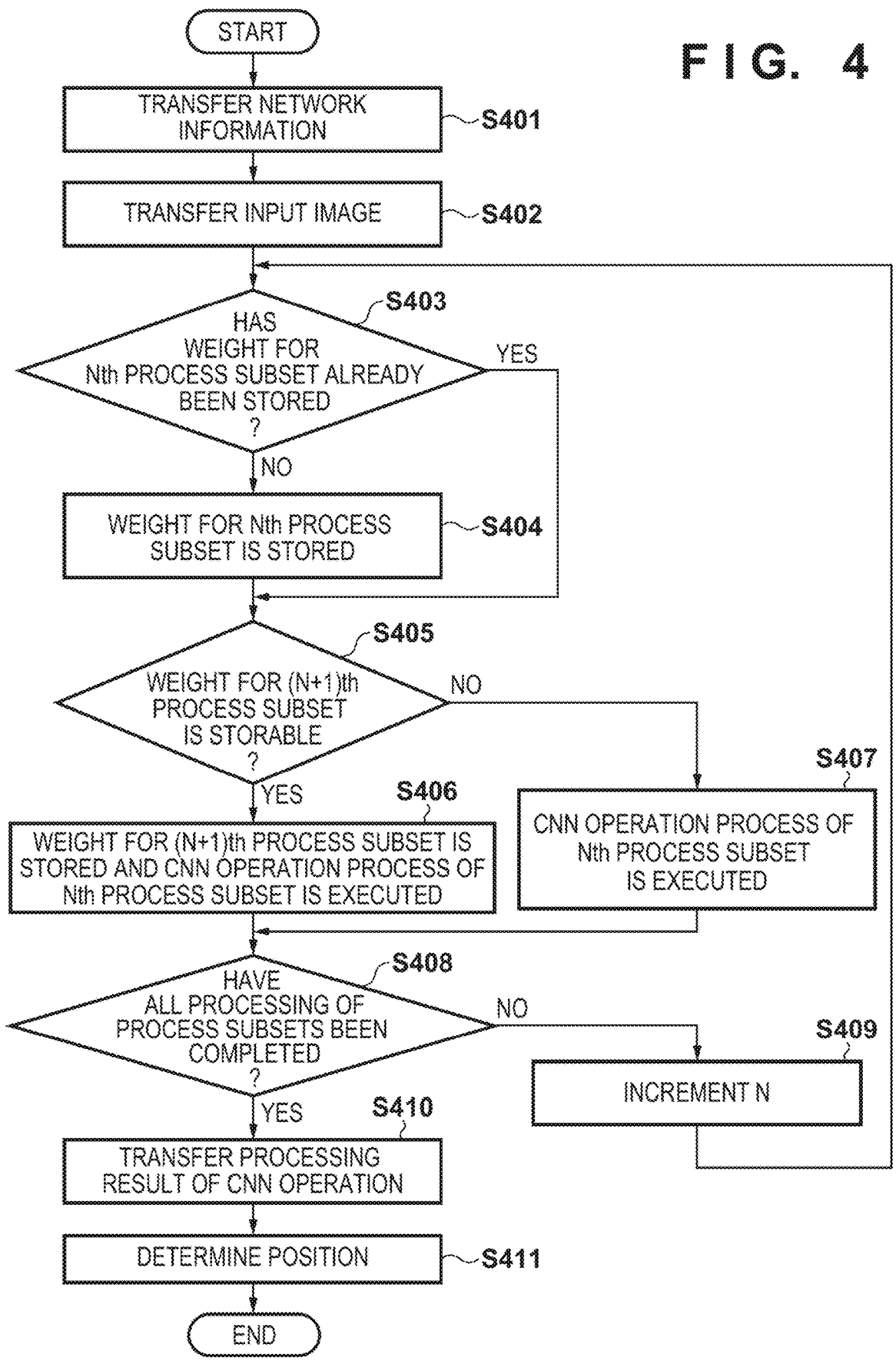
FIG. 4 is a flowchart showing the procedure of pattern recognition processing according to an embodiment.

The operation of the information processing apparatus, particularly, the switching between the double buffer method and the single buffer method will be described hereinafter with reference to FIG. 4, which is a flowchart showing the operation of the information processing apparatus according to this embodiment. An example in which the CNN is used to detect a face in an image will be described below.

In step S401, the CPU 204 instructs the DMAC 102 to transfer the network information. The DMAC 102 reads out the network information from the RAM 206 and transfers the network information to the control unit 108.

In step S402, the control unit 108 instructs the DMAC 102 to transfer an input image. The DMAC 102 reads out the preprocessed image data stored in the RAM 206 and stores the image data in the image storage unit 101. After the transfer has been completed, the process advances to step S403.

In step S403, the control unit 108 determines whether the Nth kernels have already been stored in either the first weight storage unit 103 or the second weight storage unit 104. In this case, reference symbol N corresponds to an index of the process subset in FIG. 9 and its initial value is 1. The control unit 108 can make this determination by referring to information indicating the statuses of the first weight storage unit 103 and the second weight storage unit 104. If the Nth kernels are stored in at least one of the weight storage units, the process advances to step S405. If the Nth kernels are not stored in either of the weight storage units, the process advances to step S404.

In step S404, the Nth kernels are stored in the weight storage unit(s). More specifically, the control unit 108 instructs the DMAC 102 to transfer the Nth kernels to the write unit 107. In a case in which the frame buffer method is indicated as the processing method of the Nth process subset upon referring to the network information, the control unit 108 can instruct the DMAC to transfer the kernels of the layer designated by the layer number. On the other hand, in a case in which the ring buffer method is indicated as the processing method of the Nth process subset, the control unit 108 can instruct the DMAC to transfer the kernels of the processing target layer designated by the layer number. The DMAC 102 reads out the designated kernels from the RAM 206 and transfers the kernels to the write unit 107.

Although either the first weight storage unit 103 or the second weight storage unit 104 can be selected as the storage destination, at least the first weight storage unit 103 will be selected constantly in step S404 in this embodiment. The second weight storage unit 104 will also be selected in a case in which the designated kernels cannot be contained in the first weight storage unit 103. For example, the control unit 108 can calculate the number of the Nth kernels by referring to the network information. The control unit 108 transmits, to the write unit 107, the designation of the number of kernels to be stored. If the number of kernels is equal to or smaller than the word length of the first weight storage unit 103, the control unit 108 will instruct the write unit 107 to store the kernels in the first weight storage unit 103. The control unit 108 will also update the information indicating the kernels stored by each weight storage unit so the information will indicate that the Nth kernels are being held by the first weight storage unit 103. On the other hand, if the number of kernels is larger than the word length of the first weight storage unit 103, the control unit 108 will instruct the write unit 107 to store the kernels in the first weight storage unit 103 and the second weight storage unit 104. The control unit 108 will also update the information indicating the kernels stored by each weight storage unit so the information will indicate that the Nth kernels are being held by the first weight storage unit 103 and the second weight storage unit 104. The write unit 107 will store, in accordance with the designation from the control unit 108, the kernels received from the DMAC 102 in the first weight storage unit 103 and if designated, in the second weight storage unit 104.

In step S405, the control unit 108 determines whether the (N+1)th kernels are storable in the first weight storage unit 103 or the second weight storage unit 104. In the case of this embodiment, the control unit 108 will obtain the information indicating the size of kernels and determine whether to select the double buffer method (the first operation, step S406) or the single buffer method (the second operation, step S407) based on this information indicating the size. In this embodiment, the network information includes the information which indicates the kernel size. The control unit 108 can determine, for example, whether the (N+1)th kernels are storable in the second weight storage unit 104 (or the first weight storage unit 103) in a state in which the Nth kernels are stored in the first weight storage unit 103 (or the second weight storage unit 104). If the (N+1)th kernels are storable, the control unit 108 can select the double buffer method operation. Otherwise, the single buffer method operation can be selected. More specifically, the control unit 108 can determine that the (N+1)th kernels are storable if the following three conditions can be established.

Condition 1. The Nth kernels are stored in only one of the first weight storage unit 103 and the second weight storage unit 104.

Condition 2. Of the first weight storage unit 103 and the second weight storage unit 104, the (N+1)th kernels can be contained in a weight storage unit different from the weight storage unit holding the Nth kernels among.

Condition 3. The Nth process subset is not the final process subset.

If it is determined that the (N+1)th kernels are storable, the process advances to step S406. Otherwise, the process advances to step S407.

In step S406, the storage of the (N+1)th kernels and the CNN operation on the Nth process subset are executed in parallel. In order to store the (N+1)th kernels, the control unit 108 first transmits, to the write unit 107, the designation of the number of kernels to be stored. The control unit 108 designates, as the kernel storage destination, a weight storage unit different from the weight storage unit serving as the storage destination of the Nth kernels. That is, the control unit 108 will designate the second weight storage unit 104 as the storage destination of the (N+1)th kernels if the first weight storage unit 103 has been designated as the storage destination of the Nth kernels. On the other hand, the control unit 108 will designate the first weight storage unit 103 as the storage destination of the (N+1)th kernels if the second weight storage unit 104 has been designated as the storage destination of the Nth kernels. Also, the control unit 108 will update, together with the designation method of each weight storage unit, the information indicating the kernels to be stored by each weight storage unit. Subsequently, the control unit 108 will instruct the DMAC 102 to transfer the (N+1)th kernels to the write unit 107. The write unit 107 stores the kernels received from the DMAC 102 in the first weight storage unit 103 or the second weight storage unit 104 in accordance with the designation from the control unit 108.

Furthermore, to execute the CNN operation of the Nth process subset, the control unit 108 refers to the network information to instruct the processing unit 106 of the processing method, the processing target layer number, the feature plane count, the feature plane size, and the kernel size of each processing target layer. The control unit 108 sequentially designates, in accordance with the processing method, the weight storage unit from which the kernels are to be read out, the addresses of the kernels, and the like to the readout unit 105. In this case, the control unit 108 will designate, as the weight storage unit from which the Nth kernels are to be read out, a weight storage unit different from the weight storage unit designated as the storage destination of the (N+1)th kernels in the same step S406. That is, the control unit 108 will designate the second weight storage unit 104 to the readout unit 105 if the first weight storage unit 103 has been designated as the storage destination of the (N+1)th kernels. On the other hand, the control unit 108 will designate the first weight storage unit 103 to the readout unit 105 if the second weight storage unit 104 has been designated as the storage destination of the (N+1)th kernels. The readout unit 105 will read out the kernels from the weight storage unit in accordance with the designation from the control unit 108, and transmit the kernels to the processing unit 106. The processing unit 106 reads out, from the image storage unit 101, each feature plane of the layer designated by the control unit 108, and uses the kernels received from the readout unit 105 to execute the CNN operation in accordance with the designated processing method. Subsequently, the processing unit 106 stores the feature plane that is the operation result data in the image storage unit 101.

In step S407, the CNN operation processing of the Nth process subset is executed. If the kernels stored in the first weight storage unit 103 are to be used, the first weight storage unit 103 is designated as the readout source by the control unit 108 to the readout unit 105, and the address of each kernel in the first weight storage unit 103 is designated. On the other hand, if the kernels stored in the second weight storage unit 104 are to be used, the second weight storage unit 104 is designated as the readout source to the readout unit 105, and the address of each kernel in the second weight storage unit 104 is designated. In this manner, the control unit 108 can control the readout unit 105 to read out, from both the first weight storage unit 103 and the second weight storage unit 104, the kernels required for the operation by the processing unit 106. Other contents of the CNN operation processing are similar to those of step S406.

In step S408, the control unit 108 determines whether the processing of all of the process subsets has been completed. If the processing of all of the process subsets have been completed, the process advances to step S410. On the other hand, if an unprocessed process subset remains, the process advances to step S409.

In step S409, the control unit 108 increases the index of the process subset by an increment of 1. Subsequently, the next process subset is processed in steps S403 to S407. In a case in which processing according to CNN shown in FIG. 5 is to be performed, the final feature plane 506 can be obtained by repeating the loop for four times.

In step S410, the control unit 108 instructs the DMAC 102 to transfer the processing result of the CNN operation. The DMAC 102 reads out and transfers the final feature plane 506 from the image storage unit 101 to the RAM 206 in accordance with this instruction.

Figure 3A:
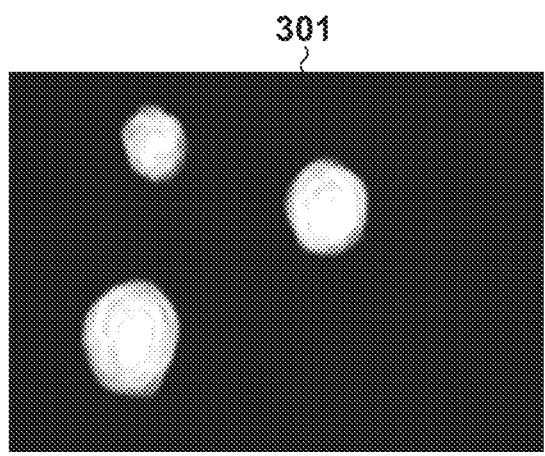
FIGS. 3A and 3B are views showing examples of pattern recognition processing result.
Figure 3B:
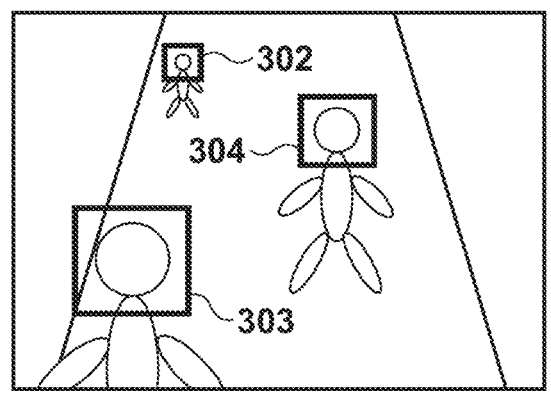

In step S411, the CPU 204 determines the detection position of a face by using the feature plane stored in the RAM 206. FIGS. 3A and 3B are views schematically showing a pattern recognition result. If a pixel of a feature plane 301 shown in FIG. 3A has a large value, it is highly possible that this pixel is positioned at the center of a face. The CPU 204 can use the feature plane 301 to extract information such as the position and the size of each face and the like. In addition, as shown in FIG. 3B, the CPU 204 can generate detection frames 302 to 304 that indicate the positions of faces based on this information, superimpose these detection frames on the input image, and cause the display unit 203 to display the resultant image.

As described above, switching between the double buffer method operation in step S406 and the single buffer method operation in step S407 is performed in accordance with the determination performed in step S405. In step S406, the processing unit 106 can read out the Nth kernels (first weight data) from the first weight storage unit 103, and perform convolution operation processing using the Nth kernels. Also, in parallel to this operation, the operation (first operation) to write the (N+1)th kernels (second weight data) to the second weight storage unit 104 is performed. In this embodiment, in a case in which the Nth kernels are stored in the first weight storage unit 103 and the (N+1)th kernels can be stored in the second weight storage unit 104, an operation as follows will be performed. The Nth kernels are stored in the first weight storage unit 103 in step S404 of the same loop or in step S406 of a previous loop. In addition, the readout operation of the Nth kernels and the write operation of (N+1)th kernels are performed in a period from the completion of the write operation of the Nth kernels to the first weight storage unit 103 until the write operation (in next loop) of (N+2)th kernels (third weight data) is started. In this case, assume that the processing unit 106 will use the Nth kernels, the (N+1)th kernels, and the (N+2)th kernels sequentially.

In step S406, the processing unit 106 can also read out the Nth kernels from the second weight storage unit 104 to perform the convolution operation processing using the Nth kernels. In parallel to this, an operation to write the (N+1)th kernels to the first weight storage unit 103 is performed. In this embodiment, this kind of operation is performed in a case in which the Nth kernels are stored in the second weight storage unit 104 and the (N+1)th kernels can be stored in the first weight storage unit 103.

On the other hand, in step S407, the processing unit 106 can read out the Nth kernels from both the first weight storage unit 103 and the second weight storage unit 104 and perform the convolution operation processing using the Nth kernels (second operation). In this case, the Nth kernels have been stored in the first weight storage unit 103 and the second weight storage unit 104 in the step S404 in the same loop. In this embodiment, the second operation is performed in a case in which the Nth kernels could not be stored in the first weight storage unit 103 or the second weight storage unit 104 in the preceding loop. The readout operation of the Nth kernels from the first weight storage unit 103 and the second weight storage unit 104 is performed in a period from the completion of the write operation of the Nth kernels (step S404) until the write operation of the (N+1)th kernels (of the next loop).

Note that in this embodiment, even in a case in which the Nth kernels are stored in only one of the first weight storage unit 103 and the second weight storage unit 104 and the (N+1)th cannot be stored in the other, the single buffer method operation will be performed. In this case, the processing unit 106 will perform control, while reading out the Nth kernels from one of the first weight storage unit 103 and the second weight storage unit 104 and performing the convolution operation processing using the Nth kernels, not to write kernels in the other weight storage unit in parallel. In such a case, the process may advance from step S405 to step S406 so that the double buffer method operation will be performed. In such a case, the processing unit 106 can perform control, in step S406, to read out the Nth kernels from one of the first weight storage unit 103 and the second weight storage unit 104 and perform the convolution operation processing using the Nth kernels. The processing unit 106 can also perform control, in parallel to the aforementioned operation, to write some of the (N+1)th kernels in the other of the first weight storage unit 103 and the second weight storage unit 104.

FIGS. 7A to 7D show the state of the first weight storage unit 103 and the second weight storage unit 104 in a case in which the CNN operation having the arrangement shown in FIG. 5 is processed based on the network information shown in FIG. 9. In FIGS. 7A to 7D, addresses 0, 1, . . . are shown sequentially from the upper portion, and each address can store one kernel. Also, reference symbols Ka,b denote one kernel. Reference symbol a indicates a layer number, and reference symbol b indicates a kernel number in the layer. In this case, assume that the layer number of the input layer is 0. An arrow in each of FIGS. 7A to 7D indicates whether the access to the weight storage unit is a write operation or a readout operation. The operation performed in the processes of steps S403 to S407 of each loop (N=1 to 4) will be described hereinafter.

First Loop (N=1)

Since this is the first processing, in step S403, the control unit 108 determines that the first kernels have not been stored. In step S404, the control unit 108 reads out, from the network information, that the first process subset is ring buffer method processing on the input layer 501 and the first layer 507. Then, the control unit 108 calculates the number of first kernels based on the feature plane count of each of the input layer 501, the first layer 507, and the second layer 508. In the example of FIG. 5, the feature planes are associated with the all of the corresponding feature planes of an adjacent layer. Hence, the number of kernels is 1 (the feature plane count of the input layer 501)×3 (the feature plane count of the first layer 507)+3 (the feature plane count of the first layer 507)×3 (the feature plane count of the second layer 508)=12.

Next, 12 is designated as the number of kernels in the write unit 107 and the first weight storage unit 103 is designated as the storage destination by the control unit 108. Also, the control unit 108 updates the information indicating the kernels to be stored by each weight storage unit so that that information will indicate that the first weight storage unit 103 and the second weight storage unit 104 are storing the first kernels. As shown in FIG. 7A, of the kernels received from the DMAC 102, the write unit 107 stores 9 kernels 511a to 514b in the first weight storage unit 103 and writes three remaining kernels 512c to 514c in the second weight storage unit 104.

Since the first kernels are stored in the first weight storage unit 103 and the second weight storage unit 104, Condition 1 of step S405 cannot be satisfied, and the process advances to step S407. In step S407, the control unit 108 refers to the network information, and designates the ring buffer method processing as the processing to be performed by the processing unit 106. The control unit 108 sets, in the processing unit 106, 0 and 1 as the processing target layer numbers, 1 as the feature plane count of the input layer 501, 3 as the feature plane count of the first layer 507, and 3×3 as the kernel size. The control unit 108 designates, to the readout unit 105, the weight storage unit and the addresses storing the kernels required for the CNN operation in accordance with the CNN operation to be performed under the ring buffer method. In this case, the control unit 108 can select the required kernels among the kernels 511a to 511c of the input layer 501 and the kernels 512a to 514c of the first layer 507. The processing unit 106 uses the feature planes read out from the image storage unit 101 and the kernels received from the readout unit 105 to perform a ring buffer method CNN operation on the input layer 501 and the first layer 507.

Second Loop (N=2)

In step S403, the control unit 108 refers to the information indicating the kernels stored by each weight storage unit, and determines that the second kernels are not stored. In step S404, the control unit 108 reads out, from the network information, that the second process subset is frame buffer method processing on the second layer 508. The control unit 108 calculates the number (9) of the second kernels by using a method similar to that used in the first loop, and designates, to the write unit 107, 9 as the number of kernels and the first weight storage unit 103 as the storage destination. Furthermore, the control unit 108 updates the information indicating the kernels stored by each weight storage unit so that the information will indicate a state in which the second kernels are stored in the first weight storage unit 103. The write unit 107 stores, as shown in FIG. 7B, the kernels 515a to 517c received from the DMAC 102 in the first weight storage unit 103.

Since the second kernels 515a to 517c are stored in only the first weight storage unit 103, Condition 1 of step S405 is satisfied. Additionally, since the third process subset is frame buffer method processing on the third layer 509 and the kernels to be used are the 9 kernels 518a to 520c, Condition 2 is also satisfied. Furthermore, since the third process subset is not the final process subset, Condition 3 of step S405 is also satisfied. In this manner, since all of Conditions 1 to 3 of step S405 are satisfied, the process advances to step S406.

In step S406, the control unit 108 designates, to the write unit 107, 9 as the number of kernels and the second weight storage unit 104 as the storage destination. The control unit 108 also updates the information indicating the kernels stored by each weight storage unit so that the information will indicate a state in which the third kernels are stored in the second weight storage unit 104. Subsequently, the control unit 108 instructs the DMAC 102 to transfer the kernels 518a to 520c of the third layer 509 to store these kernels in the second weight storage unit 104 as shown in FIG. 7C.

Furthermore, in step S406, the control unit 108 refers to the network information to designate, to the processing unit 106, the frame buffer method as the processing method, 2 as the processing target layer number, 3 as the feature plane count, and 3×3 as the kernel size. Subsequently, the control unit 108 notifies the readout unit 105 of the weight storage unit and the addresses storing the kernels required for the CNN operation among the kernels 515a to 517c of the second layer 508 in accordance with the frame buffer method CNN operation. The processing unit 106 uses the feature planes read out from the image storage unit 101 and the kernels received from the readout unit 105 to perform the frame buffer method processing on the second layer 508.

Third Loop (N=3)

Details of the processing of the third loop will be omitted since they are similar to those of the second loop. In step S403, the control unit 108 determines that the kernels 518a to 520c of the third layer 509 are already stored in the second weight storage unit 104, and the process advances to step S405. Conditions 1 to 3 of step S405 are satisfied in this case as well, and the process advances to step S406. In step S406, the control unit 108 designates, to the write unit 107, 3 (the kernels 521 to 523) as the number of kernels and the first weight storage unit 103 as the storage destination of the kernels, and updates the information indicating the kernels stored by each weight storage unit. Subsequently, as shown in FIG. 7D, the kernels 521 to 523 of the fourth layer 510 are stored in the first weight storage unit 103. Furthermore, in step S406, the control unit 108 refers to the network information and causes the processing unit 106 to perform the CNN operation on the third layer 509.

Fourth Loop (N=4)

In step S403, the control unit 108 determines, in a manner similar to that in the second and the third loops, that the kernels 521 to 523 of the fourth layer 510 are already stored in the first weight storage unit 103, and the process advances to step S405. Since the fourth process subset is the final process subset, Condition 3 of step S405 is not satisfied, and the process advances to step S407. In step S407, the control unit 108 refers to the network information and designates, to the processing unit 106, the frame buffer method as the processing method, 4 as the processing target layer number, 3 as the feature plane count, and 3×3 as the kernel size. The control unit 108 notifies the readout unit 105 of the weight storage unit and the addresses storing the kernels required for the CNN operation among the kernels 521 to 523 of the fourth layer 510 in accordance with the frame buffer method CNN operation. The processing unit 106 uses the feature planes read out from the image storage unit 101 and the kernels received from the readout unit 105 to perform the frame buffer method processing on the fourth layer 510.

In a case in which a CNN operation having the arrangement shown in FIG. 5 is to be performed based on the network information shown in FIG. 9, the word length of each weight storage unit need to be sufficiently large to process all of the process subsets by the double buffer method. That is, the memory capacity required in this case is (9+12)×9=189 bytes. In this manner, the word length of at least one of the weight storage units needs to be equal to or more than the maximum total number of kernels (12) of all of the process subsets. In contrast, the memory capacity required in this embodiment is (9+9)×9=162 bytes, and the memory capacity can be reduced by 14% compared to the case in which all of the process subsets are processed by the double buffer method. On the other hand, according to this embodiment, the processing speed can be increased because the second and the third processing loops can be processed by the double buffer method.

The arrangement of this embodiment is applicable to a case using another network arrangement. For example, the memory reduction effect can be obtained even in a case in which the CNN operation is to be performed based on the network information shown in FIG. 10. In the arrangement shown in FIG. 10, the total number of kernels required for the first process subset (ring buffer method processing) is 16+16×32+32×64+64×64=6672. Also, the total number of kernels required for the second process subset to the fourth process subset (frame buffer method processing) is 64×64=4096.

In this manner, in order to process all of the process subsets by the double buffer method, the word length of at least one of the weight storage units needs to be equal to or more than 6672 and the memory capacity needs to be equal to or more than (4096+6672)×9=94.6 Kbytes. In contrast, the memory capacity required in this embodiment is (4096+4096)×9=72.0 Kbytes, thus allowing the memory capacity to be reduced by 22.6 Kbytes.

In this embodiment, two memories are connected and used under a single buffer method during the ring buffer method processing in accordance with the network information shown in FIG. 9. Also, two memories were used under the double buffer method during the frame buffer method processing. However, this embodiment is applicable to processing executed under a different method. For example, in a case in which the frame buffer processing is to be employed as the processing method, the single buffer method and the double buffer method may be switched in accordance with the size of the weight of a layer. FIG. 11 shows an example of the network information that can be used in this kind of an arrangement.

As described above, in this embodiment, two memories are used as the weight storage memories of a neural network. In a case in which each of the weights of two successive process subsets can be stored in a corresponding one of the memories, the write operation and the readout operation of the weights are executed in parallel. In cases other than this, the write operation and the readout operation of the weights are executed sequentially. In this kind of arrangement, operation processing using a neural network can be performed at a higher speed than a case in which only the single buffer method is used in the processing, while using a smaller memory capacity than a case in which only the double buffer method is used in the processing.

Second Embodiment

In the first embodiment, a control unit 108 switched between the single buffer method and the double buffer method based on the network information. However, the control method of the switching operation is not limited to this method. In the second embodiment, whether to select the double buffer method (first operation) or the single buffer method (second operation) is determined based on control information designating the write method or the readout method of the weight data that has been prepared in advance. For example, the control unit 108 may operate in accordance with control information indicating a processing procedure as that of the first embodiment. This kind of arrangement can simplify the arrangement of the control unit 108 and reduce the circuit scale.

The network information shown in FIG. 12 can be used as this control information. The network information shown in FIG. 12 further includes the following four pieces of information in addition to the pieces of network information similar to those of FIG. 9. That is, this network information includes "weight already stored" information indicating whether the weight of each process subset is already stored and "next weight storage allowed" information indicating whether the weight of the next process subset can be stored. In addition, this network information includes "weight storage destination" information indicating the storage destination of the weight of each process subset and "number of kernels" information indicating the number of kernels of each process subset.

Since the arrangement and processing according to the second embodiment are similar to those of the first embodiment, points which are different from the first embodiment will be described below. In step S403, the control unit 108 reads out, from the network information, the "weight already stored" information of the Nth process subset. If the "weight already stored" information is YES, the process advances to step S405. If the "weight already stored" information is NO, the process advances to step S404.

In step S404, the control unit 108 reads out, from the network information, the "weight storage destination" information and the "number of kernels" information of the Nth process subset. In this case, in a case in which both a first weight storage unit 103 and a second weight storage unit 104 have been designated as the "weight storage destination", the two weight storage units will be connected and used under the single buffer method. The control unit 108 controls, in accordance with these pieces of information, a DMAC 102 and a write unit 107 in a similar manner to the first embodiment.

In step S405, the control unit 108 reads out, from the network information, the "next weight storage allowed" information of the Nth process subset. If the "next weight storage allowed" information is YES, the process advances to step S406. If the "next weight storage allowed" information is NO, the process advances to step S407.

In step S406, the control unit 108 reads out the "weight storage destination" information and the "number of kernels" information of the (N+1)th process subset. The control unit 108 controls, in accordance with these pieces of information, the DMAC 102, a readout unit 105, and the write unit 107 in a manner similar to the first embodiment. A double buffer method operation is performed in this mangier. In step S407, the control unit 108 performs control according to the single buffer method in a manner similar to that in the first embodiment.

Further Embodiments

In the embodiments described above, a first weight storage unit 103 and a second weight storage unit 104 were separate memory devices, and the write operation to one of the weight storage units and the readout operation from the other of the weight storage units could be executed in parallel. However, another arrangement that can execute the write operation and the readout operation in parallel can be employed as the first weight storage unit 103 and the second weight storage unit 104. For example, the first weight storage unit 103 and the second weight storage unit 104 can be different memory areas on a single memory device which allows simultaneous access to a plurality of areas. For example, two weight storage areas set in a dual-port memory may serve as the first weight storage unit 103 and the second weight storage unit 104, respectively. Even in this kind of embodiment, it may be arranged so that a control unit 108 can perform control, in step S406, to cause a write unit 107 and a readout unit 105 to operate in parallel. On the other hand, in steps S404 and S407, the control unit 108 can perform control to exclusively execute the weight write operation and the weight readout operation. For example, the control unit 108 can perform control so that only the write unit 107 will operate in step S404 and only the readout unit 105 will operate in step S407.

Although the write operation and the readout operation are performed completely in parallel to each other in the double buffer method, the write operation and the readout operation need not be performed completely exclusively in the single buffer method. For example, in the double buffer method, the write operation and the readout operation may be parallelly executed by a time divisional method. For example, two memory areas of a single-port memory and an adjustment circuit that adjusts the write operation and the readout operation can be used as the first weight storage unit 103 and the second weight storage unit 104. The weight write operation by the write unit 107 and the weight readout operation by the readout unit 105 can be performed in parallel by this kind of arrangement as well. In this case, the weight write operation by the write unit 107 can be performed in a period in which the operation processing by a processing unit 106 is performed but the weight readout operation by the readout unit 105 is not performed in step S406. In this manner, when the processing unit 106 is to perform the convolution operation processing by reading out weight data from one of the weight storage units, the processing unit 106 can perform the weight data write operation to the other weight storage unit in parallel. This will eliminate the need for an independent weight data write operation period, thereby improving the processing speed.

Additionally, in the single buffer method, the processing unit 106 can read out the weight data of the same process subset alternately from the first weight storage unit 103 and the second weight storage unit 104. In this case, after the weight data readout operation from one weight storage unit has been completed, the processing unit 106 may continue, in parallel to the operation to store the weight data of another process subset to this weight storage unit, to read out the weight data from the other weight storage unit.

In addition, although the information processing apparatus according to the embodiments described above included two weight storage units, it may include three or more weight storage units. For example, in a case in which Q memories are needed to store the weight of a given process subset in an information processing apparatus that includes P ($Q \leq P$) weight storage units, the weight can be stored in the Q memories that have been connected. In this case, if the weight of the next process subset can be stored in the P-Q memories, the weight of the next process subset can be stored in the remaining memory. Since this kind of an arrangement will also allow the weight readout operation and the weight write operation to be performed in parallel, the processing speed can be increased.

Furthermore, although the two weight storage units are of the same size in the embodiments described above, two weight storage units may have different sizes from each other. The size of each weight storage unit can be set in consideration of the balance between the network arrangement, the processing speed, the circuit scale, and the like.

In the embodiments described above, a single process subset to be processed by the frame buffer method included one layer, and a single process subset to be processed by the ring buffer method included a plurality of layers. However, it may be set so that the single process subset to be processed by the frame buffer method includes a plurality of layers and that the single process subset to be processed by the ring buffer will include only one layer. Even in such a case, the double buffer method and the single buffer method can be switched for each layer serving as a process subset. Furthermore, it is possible to use a processing method other than the frame buffer processing and the ring buffer processing.

In addition, in the embodiments described above, a single process subset corresponded to a convolution operation processing of one layer or a plurality of layers of a neural network. However, a single process subset may be an arbitrary portion of processing using a neural network. For example, a single process subset may be at least a part of the convolution operation processing of a single layer of a neural network. As a more specific example, a single process subset may be the convolution operation processing of a single area of a single layer, and another process subset may be the convolution operation processing of another area of the same layer. Furthermore, a single process subset may include at least a part of the convolution operation processing of each layer of a neural network with respect to two or more layers.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-002778, filed Jan. 10, 2019, which is hereby incorporated by reference herein in its entirety.

What is claimed is:

1. An information processing apparatus, comprising:
a first memory and a second memory;
a control unit configured to control writing of weight data to be used for convolution operation processing in a neural network to the first memory and the second memory, and to control readout of the weight data to be used for the convolution operation processing from the first memory and the second memory; and
a processing unit configured to perform the convolution operation processing by using the weight data read out from at least one of the first memory and the second memory,
wherein the control unit is further configured to switch an operation between
a first operation in which, after writing first weight data to the first memory, the control unit controls to read out the first weight data from the first memory and the processing unit performs the convolution operation processing using the first weight data while writing second weight data to the second memory in parallel, and
a second operation in which, after writing a part of the first weight data to the first memory and writing another part of the first weight data to the second memory, the control unit controls to read out respective parts of the first weight data from the first memory and the second memory and the processing unit performs the convolution operation processing using the first weight data.

2. The information processing apparatus according to claim 1, wherein,
the processing unit is further configured to sequentially use the first weight data, the second weight data, and third weight data, and
in the first operation, the readout of the first weight data from the first memory and the writing of the second weight data to the second memory are performed in parallel in a period from the completion of the writing of the first weight data to the first memory until the writing of the third weight data.

3. The information processing apparatus according to claim 2, wherein,
in the second operation, the respective parts of the first weight data are read out from the first memory and the second memory in a period from the completion of the writing of the first weight data until the writing of the second weight data.

4. The information processing apparatus according to claim 1, wherein the control unit is further configured to determine which of the first operation or the second operation is performed based on information for determining a way of writing the weight data in the first memory and the second memory under a single buffer method or a double buffer method.

5. The information processing apparatus according to claim 1, wherein the control unit is further configured to determine which of the first operation or the second operation is performed based on control information which is prepared in advance and for determining a way of writing the weight data in the first memory and the second memory under a single buffer method or a double buffer method.

6. The information processing apparatus according to claim 1, wherein the control unit is further configured to select the first operation in a case in which the second weight data can be stored in the second memory in a state in which the first weight data is stored in the first memory, and otherwise select the second operation.

7. The information processing apparatus according to claim 1, wherein the processing using the neural network includes a plurality of process subsets to be sequentially processed, the first weight data is weight data to be used in the convolution operation processing of a first process subset, and the second weight data is weight data to be used in the convolution operation processing of a second process subset.

8. The information processing apparatus according to claim 7, wherein a process subset of the plurality of process subsets is at least a part of the convolution operation processing of a layer of the neural network.

9. The information processing apparatus according to claim 8, wherein another process subset of the plurality of process subsets includes at least a part of the convolution operation processing of two or more layers of the neural network.

10. The information processing apparatus according to claim 7, wherein a process subset of the plurality of process subsets is convolution operation processing of all of areas of a layer of the neural network.

11. The information processing apparatus according to claim 10, wherein another process subset of the plurality of process subsets is convolution operation processing of a first area of two or more layers of the neural network and subsequent convolution operation processing of a second area of two or more layers of the neural network.

12. The information processing apparatus according to claim 1, wherein the first memory and the second memory are memory areas of different memory devices.

13. The information processing apparatus according to claim 1, wherein the first memory and the second memory are different memory areas, of a single memory device, which can be accessed simultaneously.

14. The information processing apparatus according to claim 1, further comprising a memory controller configured to instruct the writing of the weight data and the readout of the weight data to the first memory and the second memory in accordance with the control by the control unit.

15. The information processing apparatus according to claim 1, further comprising:
an obtaining unit configured to obtain recognition target data; and
a recognition unit configured to output, based on feature information obtained by inputting the data to the neural network, information indicating a recognized pattern.

16. The information processing apparatus according to claim 15, wherein the recognition target data is image data, and the recognition unit is further configured to output information indicating a recognized object.

17. The information processing apparatus according to claim 1, wherein the weight data correspond to a two-dimensional kernel.

18. The information processing apparatus according to claim 1, wherein the processing unit is further configured to cumulatively add a plurality of results obtained from respective convolution operation processing.

19. The information processing apparatus according to claim 18, wherein the processing unit is further configured to perform nonlinear conversion processing on a result of the cumulative addition.

20. A memory control method of an information processing apparatus which comprises a first memory and a second memory, comprising:
controlling writing of weight data to be used for convolution operation processing in a neural network to the first memory and the second memory; and
controlling readout of the weight data to be used for the convolution operation processing from the first memory and the second memory,
wherein in controlling the writing and readout of the weight data, an operation is switched between
a first operation of writing first weight data to the first memory, reading out the first weight data from the first memory, and performing the convolution operation processing using the first weight data while writing second weight data to the second memory in parallel, and
a second operation of writing a part of the first weight data to the first memory and writing another part of the first weight data to the second memory, reading out respective parts of the first weight data from the first memory and the second memory, and performing the convolution operation processing using the first weight data.

21. The information processing apparatus according to claim 1, wherein the number of data of the weight data when the second operation is performed is larger than the number of data of the weight data when the first operation is performed.

* * * * *